US012777399B2

(12) United States Patent
Hwang

(10) Patent No.: US 12,777,399 B2
(45) Date of Patent: Oct. 27, 2026

(54) OPERATION METHOD FOR COEXISTENCE OF CONDITIONAL MOBILITY IN NEXT-GENERATION MOBILE COMMUNICATION SYSTEM

(71) Applicant: SAMSUNG ELECTRONICS CO., LTD., Suwon-si (KR)

(72) Inventor: June Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 363 days.

(21) Appl. No.: 18/550,102

(22) PCT Filed: Mar. 8, 2022

(86) PCT No.: PCT/KR2022/003298

§ 371 (c)(1),
(2) Date: Sep. 11, 2023

(87) PCT Pub. No.: WO2022/191600

PCT Pub. Date: Sep. 15, 2022

(65) Prior Publication Data

US 2024/0187956 A1 Jun. 6, 2024

(30) Foreign Application Priority Data

Mar. 9, 2021 (KR) ........................ 10-2021-0031048

(51) Int. Cl.
*H04W 36/36* (2009.01)
*H04W 36/00* (2009.01)
*H04W 36/24* (2009.01)

(52) U.S. Cl.
CPC .... *H04W 36/362* (2023.05); *H04W 36/00698* (2023.05); *H04W 36/247* (2023.05)

(58) Field of Classification Search
None
See application file for complete search history.

(56) References Cited

U.S. PATENT DOCUMENTS

2019/0223057 A1* 7/2019 Park .................. H04W 36/0085
2021/0112475 A1* 4/2021 Kim .................. H04W 36/0061
(Continued)

FOREIGN PATENT DOCUMENTS

KR 102159998 B1 9/2020

OTHER PUBLICATIONS

Supplementary European Search Report dated Aug. 6, 2024, in connection with European Patent Application No. 22767496.7, 15 pages.

(Continued)

*Primary Examiner* — Rafael Pérez-Gutiérrez
*Assistant Examiner* — Frank E. Donado

(57) ABSTRACT

According to an embodiment of the present disclosure, a method performed by a user equipment (UE) in a wireless communication system is provided. The method according to the embodiment includes evaluating a mobility execution condition based on first conditional mobility configuration information among a plurality of conditional mobility configuration information received from a network, executing conditional mobility based on the first conditional mobility configuration information when the mobility execution condition based on the first conditional mobility configuration information is satisfied, and releasing second conditional mobility configuration information different from the first conditional mobility configuration information from among the stored plurality of conditional mobility configuration information.

15 Claims, 13 Drawing Sheets

(56) References Cited

U.S. PATENT DOCUMENTS

2023/0189095 A1* 6/2023 Da Silva .............. H04W 76/19 455/437
2023/0262540 A1* 8/2023 Kim ...................... H04W 76/19 370/216

OTHER PUBLICATIONS

ETSI TS 138 523-1 V16.6.0 (Feb. 2021), Technical Specification, "5G; 5GS; User Equipment (UE) conformance specification; Part 1: Protocol (3GPP TS38.523-1 version 16.6.0 Release 16)", 2482 pages.
CATT: "Introduction of Conditional PSCell Change for intra-SN without MN involvement", 3GPP TSG-RAN WG2 Meeting #109 electronic, Elbonia, Feb. 24-Mar. 6, 2020, R2-2002248 (revision of R2-2001043), 32 pages.
3GPP TS 38.331 V18.0.0 (Dec. 2023); Technical Specification; 3rd Generation Partnership Project; Technical Specification Group Radio Access Network; NR; Radio Resource Control (RRC) protocol specification (Release 18); 1608 pages.
Ericsson: "Missing release of VarConditionalReconfiguration", 3GPP TSG-RAN WG2 Meeting #112e, , Electronic Meeting, Nov. 2020, R2-2009997, 9 pages.
Nokia et al: "Report from [AT109bis-e] [207] [MOB] Open CHO issues", R2-2003847, 3GPP TSG-RAN WG2 Meeting #109bis-e, Elbonia, Online, Apr. 2020, 18 pages.
Sharp: "UE assistance information transmission in CHO case", 3GPP TSG-RAN WG2#111 e-meeting, Elbonia Aug. 2020, R2-2007718, 5 pages.
International Search Report and Written Opinion of the International Searching Authority dated Jun. 16, 2022, in connection with International Application No. PCT/KR2022/003298, 7 pages.
CATT, "Report on Email Discussion [107b#52][NR MobE] Open Issues Conditional PSCell Addition/Change (CATT)", R2-1915962, 3GPP TSG-RAN WG2 #108, Reno, USA, Nov. 2019, 46 pages.
Intel Corporation, "Summary of discussion [210][MOB] CHO/CPC corrections (Intel)", R2-2101963, 3GPP TSG-RAN WG2 #113-e, Jan. 25-Feb. 5, 2021, 25 pages.
Ericsson, "Further details on CHO failure handling", R2-1914639, 3GPP TSG-RAN WG2 #108, Reno, USA, Nov. 2019, 10 pages.
CATT, "Introduction of Conditional PSCell Change for intra-SN without MN involvement", R2-2006379, 3GPP TSG-RAN WG2 #110-e, Jun. 2020, 21 pages.
Huawei, "Support of conditional PSCell change/addition", R3-210504, 3GPP TSG-RAN WG3 #111-e, Feb. 2021, 46 pages.
Office Action dated Jun. 29, 2026, in connection with Korean Application No. 10-2021-0031048, 10 pages.
Office Action issued Jul. 30, 2016, in connection with European Patent Application No. 22767496.7, 7 pages.

* cited by examiner

OPERATION METHOD FOR COEXISTENCE OF CONDITIONAL MOBILITY IN NEXT-GENERATION MOBILE COMMUNICATION SYSTEM

TECHNICAL FIELD

The present disclosure relates to execution of each mobility operation when configurations for conditional mobility operations coexist.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, technologies such as beamforming, massive multiple-input multiple-output (MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes, such as Hybrid FSK and QAM Modulation (FQAM) and Sliding Window Superposition Coding (SWSC), and advanced access techniques, such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, healthcare, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

DISCLOSURE

Technical Problem

A technical problem in an embodiment of the present disclosure is to define an operation of a user equipment (UE) such that, because when configurations for conditional mobility operations are respectively given for a master cell group (hereinafter referred to as an "MCG") and a secondary cell group (hereinafter referred to as an "SCG"), conditions for the conditional mobility operations configured for the MCG and the SCG may be satisfied independently, one conditional mobility operation for which the condition is first satisfied, is executed first, and then the other conditional mobility operation is stopped or is executed subsequently. That is, this is to address confusion due to the possibility of simultaneous application of different radio resource control (RRC) reconfigurations (RRCReconfiguration) when conditional mobility conditions are respectively configured for the MCG and SCG.

Technical Solution

To solve the above-described problem, while mobility based on one of the simultaneously given conditional mobility configurations is performed, an operation of determining a condition for the other conditional mobility is controlled. In addition, after the one conditional mobility is executed, a configuration for the other conditional mobility is selectively released from a storage of the UE according to a type of the conditional mobility executed, thereby preventing conditional mobility from being executed via unnecessary previous information after completion of the conditional mobility.

According to embodiments of the present disclosure, in the case of dual connectivity (also referred to as dual connection or DC), when the UE is configured with a conditional handover (CHO) for a primary cell (hereinafter referred to as a "PCell") change in an MCG, and is also configured with a conditional primary secondary cell (hereinafter referred to as "PSCell") change (CPC) for a PSCell change in an SCG or conditional PSCell addition (CPA), the UE stops evaluation of CPA and CPC (hereinafter referred to as "CPAC") conditions during a CHO operation or stops evaluation of a CHO condition during a CPAC operation, thereby preventing confusion in an RRCReconfiguration message that the UE should apply when the CHO and the CPAC are to be executed simultaneously.

BEST MODE

Figure 1:
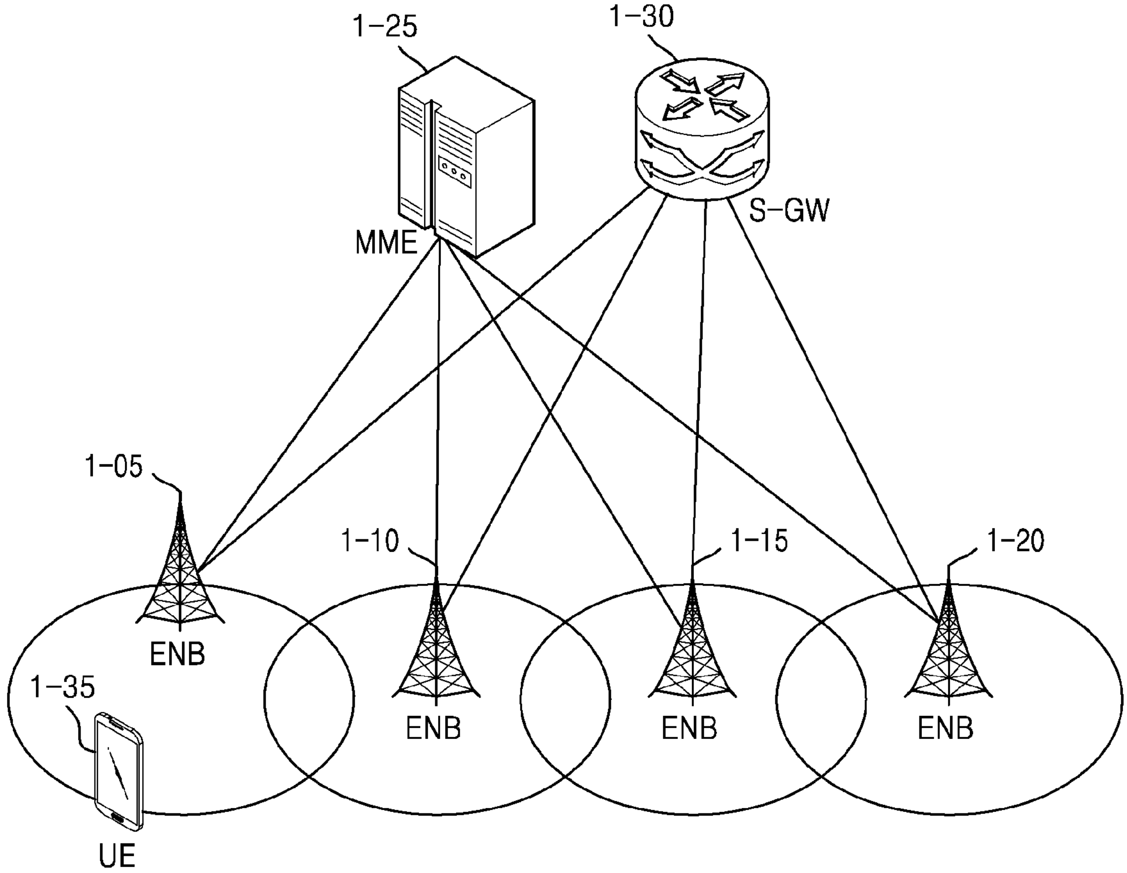
FIG. 1 illustrates a structure of a long-term evolution (LTE) system according to an embodiment of the present disclosure.

According to an embodiment of the present disclosure, a method performed by a user equipment (UE) in a wireless communication system is provided. The method according to the embodiment includes: receiving a plurality of conditional mobility configuration information from a network; storing the plurality of conditional mobility configuration information; evaluating a mobility execution condition based on first conditional mobility configuration information among the plurality of conditional mobility configuration information; executing conditional mobility based on the first conditional mobility configuration information when the mobility execution condition based on the first conditional mobility configuration information is satisfied; and releasing second conditional mobility configuration information different from the first conditional mobility configuration information from among the stored plurality of conditional mobility configuration information.

According to an embodiment, the plurality of conditional mobility configuration information include conditional handover (CHO) configuration information for changing a primary cell (PCell) of a master cell group (MCG) and conditional primary secondary cell (PSCell) addition/change (CPAC) configuration information for adding or changing a PSCell of a secondary cell group (SCG).

According to an embodiment, the first conditional mobility configuration information is the CHO configuration information, the second conditional mobility configuration information is the CPAC configuration information, an execution condition for a CHO is evaluated based on the CHO configuration information, and the releasing includes, if the execution condition for the CHO is satisfied, executing the CHO and releasing the CPAC configuration information.

According to an embodiment, the plurality of conditional mobility configuration information are stored in a variable VarConditionalReconfig, and when the CHO is executed and random access is successfully completed, an entry related to the CPAC configuration information stored in the variable VarConditionalReconfig is released.

According to an embodiment, the first conditional mobility configuration information is the CPAC configuration information, the second conditional mobility configuration information is the CHO configuration information, an execution condition for CPAC is evaluated based on the CPAC configuration information, and the releasing includes, if the execution condition for the CPAC is satisfied, executing the CPAC and releasing the CHO configuration information.

According to an embodiment, the plurality of conditional mobility configuration information are stored in the variable VarConditionalReconfig, and when the CPAC is executed and random access is successfully completed, an entry related to the CHO configuration information stored in the variable VarConditionalReconfig is released.

According to an embodiment, the plurality of conditional mobility configuration information are received from the network via an RRCReconfiguration message.

According to an embodiment of the present disclosure, a UE in a wireless communication system is provided, which includes: a transceiver; and at least one processor coupled to the transceiver and configured to receive a plurality of conditional mobility configuration information from a network, store the plurality of conditional mobility configuration information, evaluate a mobility execution condition based on first conditional mobility configuration information among the plurality of conditional mobility configuration information, execute conditional mobility based on the first conditional mobility configuration information when the mobility execution condition based on the first conditional mobility configuration information is satisfied, and release second conditional mobility configuration information different from the first conditional mobility configuration information from among the stored plurality of conditional mobility configuration information.

According to an embodiment, the plurality of conditional mobility configuration information include CHO configuration information for changing a PCell of an MCG and CPAC configuration information for adding or changing a PSCell of an SCG.

According to an embodiment, the first conditional mobility configuration information is the CHO configuration information, and the second conditional mobility configuration information is the CPAC configuration information, and the at least one processor is further configured to evaluate an execution condition for a CHO based on the CHO configuration information, and if the execution condition for the CHO is satisfied, execute the CHO and releases the CPAC configuration information.

According to an embodiment, the at least one processor is further configured to store the plurality of conditional mobility configuration information in a variable VarConditionalReconfig, and when the CHO is executed and random access is successfully completed, release an entry related to the CPAC configuration information stored in the variable VarConditionalReconfig.

According to an embodiment, the first conditional mobility configuration information is the CPAC configuration information, and the second conditional mobility configuration information is the CHO configuration information, and the at least one processor is further configured to evaluate an execution condition for CPAC based on the CPAC configuration information, and if the execution condition for the CPAC is satisfied, execute the CPAC and releases the CHO configuration information.

According to an embodiment, the at least one processor is further configured to store the plurality of conditional mobility configuration information in the variable VarConditionalReconfig, and when the CPAC is executed and random access is successfully completed, release an entry related to the CHO configuration information stored in the variable VarConditionalReconfig.

According to an embodiment, the plurality of conditional mobility configuration information are received from the network via an RRCReconfiguration message.

According to an embodiment of the present disclosure, a method performed by a base station in a wireless communication system is provided. According to an embodiment, the method includes: generating CHO configuration information for changing a PCell of an MCG; generating CPAC configuration information for adding or changing a PSCell of an SCG; and transmitting the CHO configuration information and the CPAC configuration information to a UE, and when executing conditional mobility based on one conditional mobility configuration information among the CHO configuration information and the CPAC configuration information, the UE releases the other conditional mobility configuration information.

MODE FOR INVENTION

Hereinafter, preferred embodiments of the present disclosure will be described in detail with reference to the accompanying drawings. It should be noted that the same elements are represented by the same reference numerals wherever possible. Furthermore, detailed descriptions of known functions and configurations that may obscure the essence of the present disclosure will be omitted.

In describing embodiments in the present specification, descriptions of technical features that are well known in the art to which the present disclosure pertains and are not directly related to the present disclosure are omitted. This is for clearly describing the essence of the present disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In each drawing, the same reference numerals are assigned to the same or corresponding elements throughout.

Advantages and features of the present disclosure and methods of accomplishing the same will be more readily appreciated by referring to the following description of embodiments and the accompanying drawings. However, the present disclosure should not be construed as being limited to embodiments set forth below but may be embodied in many different forms; rather, the present embodiments are provided so that the present disclosure will be thorough and complete and will fully convey the concept of the present disclosure to those of ordinary skill in the art, and the present disclosure will only be defined by the appended claims. Throughout the specification, like reference numerals refer to like elements.

It will be understood that each block of a flowchart in the drawings and combinations of blocks of the flowchart may be performed by computer program instructions. These computer program instructions may be loaded into a processor of a general-purpose computer, a special-purpose computer, or other programmable data processing equipment, and thus, the instructions performed via the processor of the computer or other programmable data processing equipment create a means for performing functions specified in the flowchart block(s). The computer program instructions may also be stored in a computer-executable or computer-readable memory capable of directing a computer or other programmable data processing equipment to implement functions in a specific manner, and thus, the instructions stored in the computer-executable or computer-readable memory may produce an article of manufacture including instruction means for performing the functions described in the flowchart block(s). The computer program instructions may also be loaded into a computer or other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

Furthermore, each block may represent a portion of a module, segment, or code that includes one or more executable instructions for executing specified logical function(s). It should also be noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and performs certain functions. However, the term 'unit' is not limited to software or hardware. The 'unit' may be configured to be in an addressable storage medium or configured to operate one or more processors. Thus, the term 'unit' may include, for example, elements such as software elements, object-oriented software elements, class elements, and task elements, processes, functions, attributes, procedures, subroutines, segments of program code, drivers, firmware, micro-codes, circuits, data, a database, data structures, tables, arrays, and variables. Functions provided by the elements and 'units' may be combined into the smaller number of elements and 'units', or may be further divided into additional elements and 'units'. Furthermore, the elements and 'units' may be embodied to reproduce one or more central processing units (CPUs) in a device or security multimedia card. As used in the following description, terms identifying access nodes, terms indicating network entities, terms indicating messages, terms indicating interfaces between network entities, terms indicating various types of identification information, etc. are exemplified for convenience of description. Accordingly, the present disclosure is not limited to terms to be described later, and other terms representing objects having the equivalent technical meaning may be used.

Hereinafter, for convenience of descriptions, the present disclosure uses terms and names defined in the $3^{rd}$ Generation Partnership Project Long-Term Evolution (3GPP LTE) specifications. However, the present disclosure is not limited to the terms and names but may also be identically applied to systems that comply with other standards.

In various embodiments of the present disclosure, a master node (MN) may be interpreted as a master base station, and a secondary node (SN) may be interpreted as a secondary base station. Furthermore, in various embodiments of the present disclosure, MN and SN may be interpreted as different base stations or base stations using different radio access technologies (RATs), and in some cases, may be used as base stations using the same RAT. The MN and the SN may be distinguished using general expressions such as a first base station and a second base station.

In various embodiments of the present disclosure, a radio resource control (RRC) message transmitted by an MN may be referred to as an MN RRC message. Also, an RRC message generated by an SN may be referred to as an SN RRC message.

FIG. 1 illustrates a structure of an LTE system according to an embodiment of the present disclosure.

Referring to FIG. 1, a radio access network for the LTE system may consist of next-generation base stations that are evolved Node Bs (hereinafter referred to as eNBs, Node Bs, or base stations) 1-05, 1-10, 1-15, and 1-20, a mobility management entity (MME) 1-25, and a serving-gateway (S-GW) 1-30. A user equipment (hereinafter, referred to as a 'UE' or terminal) 1-35 may connect to an external network via the eNBs 1-05 to 1-20 and the S-GW 1-30.

In FIG. 1, the eNBs 1-05 to 1-20 may correspond to existing node Bs in a universal mobile telecommunication system (UMTS). The eNBs are each connected to the UE 1-35 via radio channels and may perform more complicated functions than the existing Node B. In the LTE system, all user traffic including real-time services like voice over Internet protocol (VoIP) services may be served on shared channels. Therefore, an entity may be required to perform scheduling by collecting status information such as buffer states, available transmit power states, and channel states for UEs, and each of the eNBs 1-05 to 1-20 may be responsible for this function. One eNB generally may control multiple cells. For example, to achieve a data rate of 100 megabits per second (Mbps), the LTE system may utilize orthogonal frequency division multiplexing (OFDM) as a radio access scheme, e.g., in a 20 MHz bandwidth. Furthermore, the LTE system may apply adaptive modulation & coding (AMC) that determines a modulation scheme and a channel coding rate according to channel states of UEs. The S-GW 1-30 is an entity for providing a data bearer and may create or delete the data bearer according to control by the MME 1-25. The MME 1-25 is responsible for performing various control functions as well as mobility management for the UE 1-35 and may be connected to the multiple base stations 1-05 to 1-20.

Figure 2:
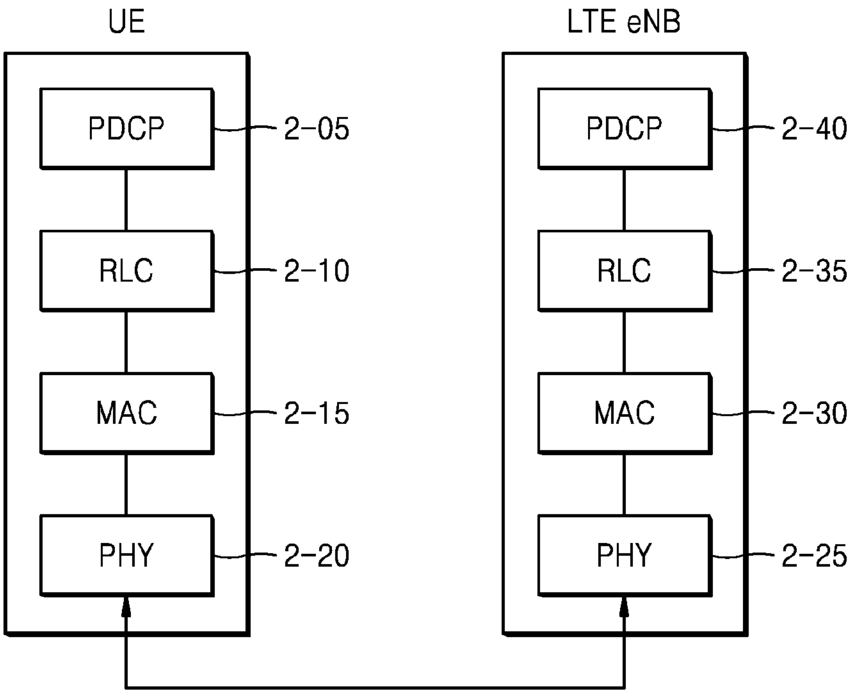
FIG. 2 illustrates a radio protocol architecture for an LTE system, according to an embodiment of the present disclosure.

FIG. 2 illustrates a radio protocol architecture for an LTE system, according to an embodiment of the present disclosure.

Referring to FIG. 2, a radio protocol stack for each of a UE and an eNB in the LTE system may consist of packet data convergence protocol (PDCP) 2-05 or 2-40, radio link control (RLC) 2-10 or 2-35, and medium access control (MAC) 2-15 or 2-30. The PDCP 2-05 or 2-40 may be responsible for operations such as Internet Protocol (IP) header compression/decompression. Main functions of the PDCP 2-05 or 2-40 are summarized as follows.

Header compression and decompression: robust header compression (ROHC) only
Transfer of user data
In-sequence delivery of upper layer packet data units (PDUs) at PDCP re-establishment procedure for RLC acknowledged mode (AM)
Reordering (for split bearers in dual connectivity (DC) (only support for RLC AM): PDCP PDU routing for transmission and PDCP PDU reordering for reception)
Duplicate detection of lower layer service data units (SDUs) at PDCP re-establishment procedure for RLC AM
Retransmission of PDCP SDUs at handover, and, for split bearers in DC, of PDCP PDUs at PDCP data-recovery procedure, for RLC AM
Ciphering and deciphering
Timer-based SDU discard in uplink (UL)

The RLC 2-10 or 2-35 may reconfigure PDCP PDUs in an appropriate size to perform an automatic repeat request (ARQ) operation, etc. Main functions of the RLC 2-10 or 2-35 may be summarized as follows.

Transfer of upper layer PDUs
ARQ (Error correction through ARQ (only for AM data transfer))
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2-15 or 2-30 may be connected with multiple RLC layers configured in a UE and may multiplex RLC PDUs into MAC PDUs and demultiplex RLC PDUs from MAC PDUs. Main functions of the MAC 2-15 or 2-30 may be summarized as follows.

Mapping between logical channels and transport channels
Multiplexing/demultiplexing of MAC SDUs belonging to one or different logical channels into/from transport blocks (TBs) delivered to/from the physical layer on transport channels
Scheduling information reporting
Hybrid ARQ (HARQ) (Error correction through HARQ)
Priority handling between logical channels of one UE
Priority handling between UEs by means of dynamic scheduling
Multimedia broadcast/multicast service (MBMS) service identification
Transport format selection
Padding A physical layer (a PHY layer) 2-20 or 2-25 may perform channel coding and modulation on upper-layer data to generate OFDM symbols and transmit the OFDM symbols via a radio channel, or perform demodulation and channel decoding on OFDM symbols received via a radio channel and transfer the demodulated and channel-decoded OFDM symbols to an upper layer.

Figure 3:
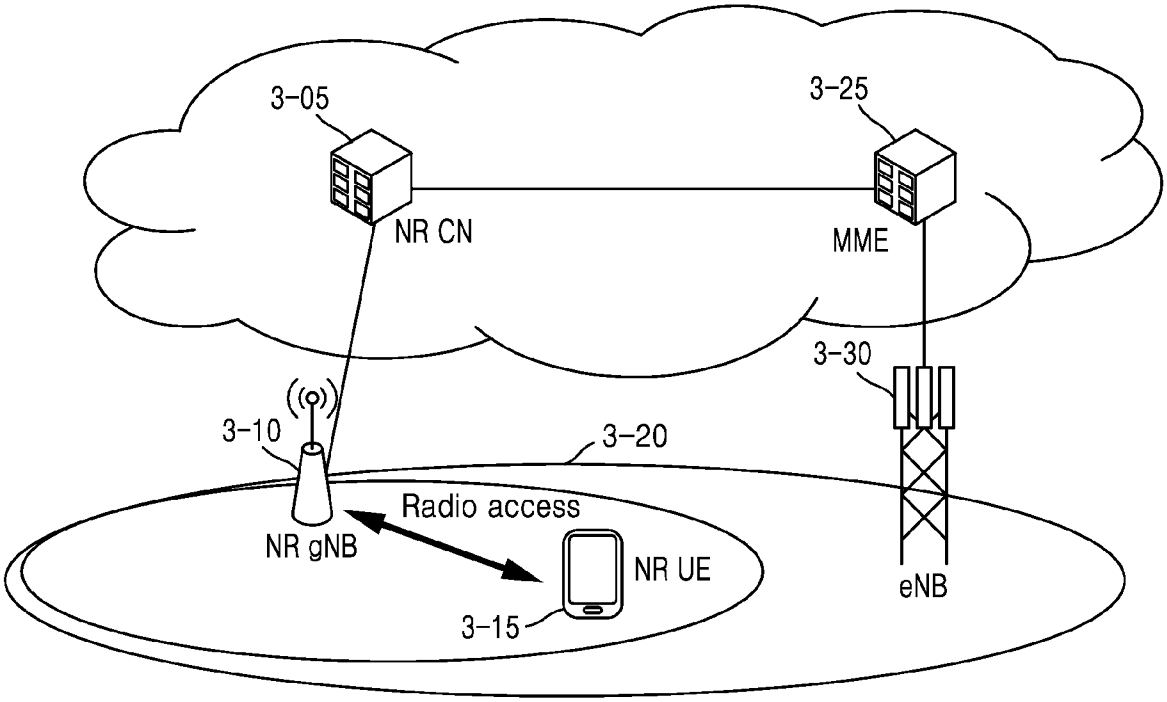
FIG. 3 illustrates a structure of a next-generation mobile communication system according to an embodiment of the present disclosure.

FIG. 3 illustrates a structure of a next-generation mobile communication system according to an embodiment of the present disclosure.

Referring to FIG. 3, a radio access network for the next-generation (hereinafter referred to as new radio (NR) or 5th generation (5G)) mobile communication system may consist of a next-generation base station, i.e., a new ratio node B (hereinafter, referred to as "gNB", "NR NB", "NR gNB", or "NR base station") 3-10 and a next-generation core network (or an NR core network (NR CN)) 3-05. A next-generation UE (an NR UE or terminal) 3-15 may connect to an external network via the NR gNB 3-10 and the NR CN 3-05.

In FIG. 3, the NR gNB 3-10 corresponds to an eNB in the legacy LTE system. The NR gNB 3-10 may be connected to the NR UE 3-15 via a radio channel and provide a higher level of service than the existing node B. In the next-generation mobile communication system, all user traffic may be served on shared channels. Therefore, an entity may be required to perform scheduling by collecting status information such as buffer states, available transmit power states, and channel states for UEs, and the NR gNB 3-10 may be responsible for this function. One NR gNB generally may control multiple cells. In the next-generation mobile communication system, bandwidths greater than the existing maximum bandwidth may be applied to provide ultra-high-speed data transfer as compared to current LTE. Furthermore, a beamforming technique may be additionally applied using OFDM as a radio access scheme. Furthermore, an AMC scheme may be applied to determine a modulation scheme and a channel coding rate according to channel states of UEs. The NR CN 3-05 may perform functions such as mobility support, bearer configuration, quality of service (QoS) configuration, etc. The NR CN 3-05 is an entity responsible for performing various control functions as well as mobility management for a UE and may be connected to multiple base stations. Furthermore, the next-generation mobile communication system may interwork with the legacy LTE system, and the NR CN 3-05 may be connected with an MME 3-25 via a network interface. The MME 3-25 may be connected to an eNB 3-30 that is the existing base station.

Figure 4:
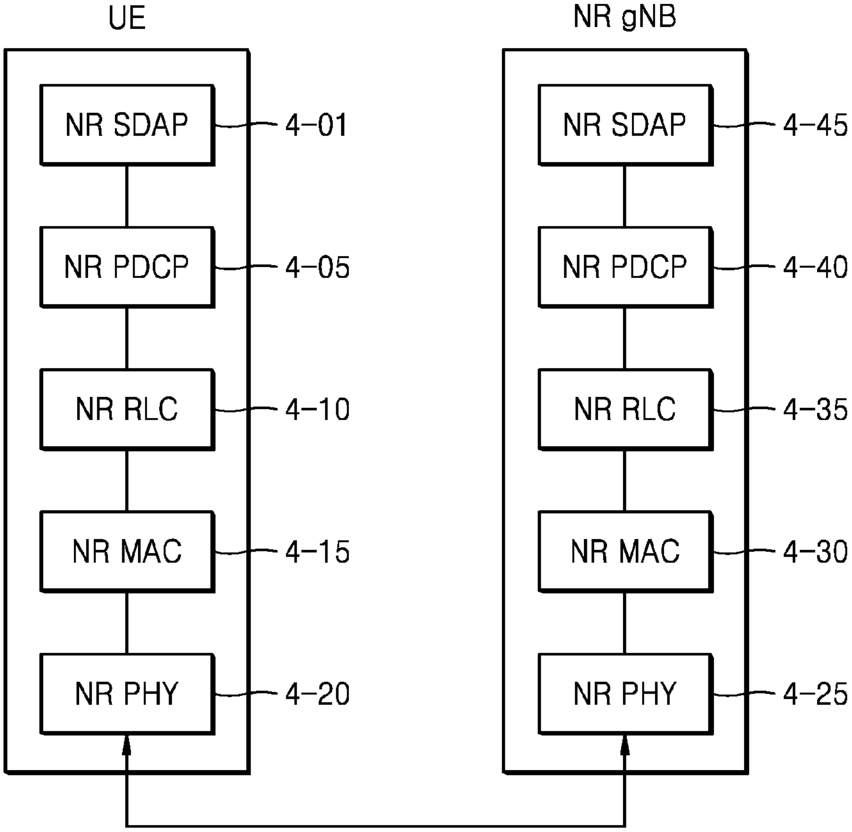
FIG. 4 illustrates a radio protocol architecture for a next-generation mobile communication system, according to an embodiment of the present disclosure.

FIG. 4 illustrates a radio protocol architecture for a next-generation mobile communication system, according to an embodiment of the present disclosure.

Referring to FIG. 4, a radio protocol stack for each of a UE and an NR base station in the next-generation mobile communication system includes NR service data adaptation protocol (NR SDAP) 4-01 or 4-45, NR PDCP 4-05 or 4-40, NR RLC 4-10 or 4-35, and NR MAC 4-15 or 4-30.

Main functions of the NR SDAP 4-01 or 4-45 may include some of the following functions.

Transfer of user plane data

Mapping between a QoS flow and a data radio bearer (DRB) for both downlink (DL) and UL Marking a QoS flow ID in both DL and UL packets Reflective QoS flow to DRB mapping for the UL SDAP PDUs For a SDAP layer, the UE may receive, via an RRC message, a configuration as to whether to use a header of the SDAP layer or a function of the SDAP layer per PDCP layer, per bearer, or per logical channel. When an SDAP header is configured, a 1-bit non-access stratum (NAS) reflective QoS indicator and a 1-bit AS reflective QoS indicator in the SDAP header may instruct the UE to update or reconfigure information about mapping between a QoS flow to a DRB for both UL and DL. The SDAP header may include QoS flow ID information identifying QoS. QoS information may be used as a priority for data processing, scheduling information, etc. to support a smooth service.

Main functions of the NR PDCP 4-05 or 4-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in UL

In the above description, the reordering function of an NR PDCP entity may refer to a function of sequentially reordering PDCP PDUs received from a lower layer based on a PDCP sequence number (SN). The reordering function of the NR PDCP entity may include a function of transmitting data to an upper layer in an order the data is reordered, a function of directly transmitting data to an upper layer without taking the order into account, a function of reordering PDCP PDUs and recording missing PDCP PDUs, a function of submitting a status report on the missing PDCP PDUs to a transmitting side, and a function of requesting retransmission of the missing PDCP PDUs.

Main functions of the NR RLC 4-10 or 4-35 may include some of the following functions.

Transfer of upper layer PDUs

In-sequence delivery of upper layer PDUs

Out-of-sequence delivery of upper layer PDUs

ARQ (Error correction through ARQ)

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, the in-sequence delivery function of an NR RLC entity may refer to a function of sequentially transmitting RLC SDUs received from a lower layer to an upper layer. The in-sequence delivery function of the NR RLC entity may include a function of, when one RLC SDU is segmented into multiple RLC SDUs and received, reassembling and transmitting the multiple RLC SDUs.

The in-sequence delivery function of the NR RLC entity may include a function of reordering received RLC PDUs based on an RLC SN or a PDCP SN, a function of reordering RLC PDUs and recording missing RLC PDUs, a function of submitting a status report on the missing RLC PDUs to a transmitting side, and a function of requesting retransmission of the missing RLC PDUs.

The in-sequence delivery function of the NR RLC entity may include a function of sequentially transferring, when there is a missing RLC SDU, only RLC SDUs preceding the missing RLC SDU to an upper layer.

The in-sequence delivery function of the NR RLC entity may include a function of sequentially transferring, to an upper layer, all RLC SDUs received before a given timer is restarted when the timer expires even though there is a missing RLC SDU.

The in-sequence delivery function of the NR RLC entity may include a function of sequentially transferring, to the upper layer, all RLC SDUs received up to a current time point when the given timer expires even though there is a missing RLC SDU.

The NR RLC entity may process RLC PDUs in an order that the RLC PDUs are received and transmit the RLC PDUs to the NR PDCP entity, regardless of the order of SNs.

When receiving RLC SDU segments, the NR RLC entity may receive segments stored in a buffer or segments to be subsequently received to reconstruct a whole RLC PDU and then transfer the RLC PDU to the NR PDCP entity.

The NR RLC layer may not include a concatenation function, and the concatenation function may be performed at the NR MAC layer or be replaced with the multiplexing function of the NR MAC layer.

In the above description, the out-of-sequence delivery function of the NR RLC entity may refer to a function of directly transmitting RLC SDUs received from a lower layer to an upper layer regardless of their orders. The out-of-sequence delivery function of the NR RLC entity may include a function of, when one RLC SDU is segmented into multiple RLC SDUs and received, reassembling and transmitting the multiple RLC SDUs. The out-of-sequence delivery function of the NR RLC entity may include a function of storing RLC SNs or PDCP SNs of received RLC PDUs, ordering the RLC PDUs, and recording missing RLC PDUs.

The NR MAC 4-15 or 4-30 may be connected to multiple NR RLC layers configured in one UE or NR gNB, and main functions of the NR MAC 4-15 or 4-30 may include some of the following functions.

Mapping between logical channels and transport channels
Multiplexing/demultiplexing of MAC SDUs
Scheduling information reporting
HARQ (Error correction through HARQ)
Priority handling between logical channels of one UE
Priority handling between UEs by means of dynamic scheduling
MBMS service identification
Transport format selection
Padding An NR PHY layer 4-20 or 4-25 may perform channel coding and modulation on upper layer data to generate OFDM symbols and transmit the OFDM symbols via a radio channel, or perform demodulation and channel decoding on OFDM symbols received via a radio channel and transfer the demodulated and channel-decoded OFDM symbols to an upper layer.

Figure 5:
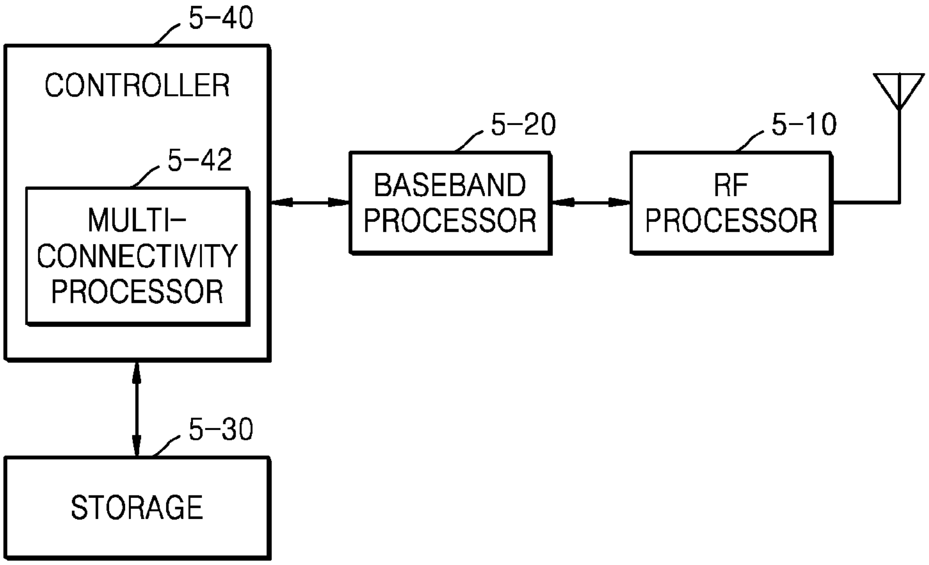
FIG. 5 is a block diagram of an internal structure of a user equipment (UE) according to an embodiment of the present disclosure.

FIG. 5 is a block diagram of an internal structure of a UE according to an embodiment of the present disclosure.

Referring to FIG. 5, the UE may include a radio frequency (RF) processor 5-10, a baseband processor 5-20, a storage 5-30, and a controller 5-40. The controller 5-40 may include a multi-connectivity processor 5-42 that performs processing for operating in a multi-connectivity mode.

The RF processor 5-10 may perform a function for transmitting and receiving a signal via a radio channel, such as signal conversion between bands and amplification. In detail, the RF processor 5-10 may up-convert a baseband signal provided from the baseband processor 5-20 into an RF signal and transmit the RF signal via an antenna, and down-convert an RF signal received via the antenna into a baseband signal. For example, the RF processor 5-10 may include a transmit filter, a receive filter, an amplifier, a mixer, an oscillator, a digital-to-analog converter (DAC), an analog-to-digital converter (ADC), etc. Although only one antenna is illustrated in FIG. 5, the UE may include multiple antennas. The RF processor 5-10 may also include multiple RF chains. Furthermore, the RF processor 5-10 may perform beamforming. For the beamforming, the RF processor 5-10 may adjust a phase and a magnitude of each of the signals transmitted and received through multiple antennas or antenna elements. Also, the RF processor 5-10 may perform multiple-input multiple-output (MIMO), and receive multiple layers when performing the MIMO operation.

The baseband processor 5-20 performs a function for conversion between a baseband signal and a bit string according to a physical layer standard of the system. For example, when transmitting data, the baseband processor 5-20 generates complex symbols by encoding and modulating a transmission bit string. Furthermore, when receiving data, the baseband processor 5-20 reconstructs a reception bit string by demodulating and decoding a baseband signal from the RF processor 5-10. For example, according to an OFDM scheme, when transmitting data, the baseband processor 5-20 generates complex symbols by encoding and modulating a transmission bit string, maps the complex symbols to subcarriers, and then produces OFDM symbols through inverse fast Fourier transform (IFFT) operations and cyclic prefix (CP) insertion. Furthermore, when receiving data, the baseband processor 5-20 divides the baseband signal from the RF processor 5-10 into OFDM symbols, recovers signals mapped to subcarriers through FFT operations, and then reconstructs a reception bit string through demodulation and decoding.

The baseband processor 5-20 and the RF processor 5-10 may transmit and receive signals as described above. Thus, the baseband processor 5-20 and the RF processor 5-10 may be referred to as a transmitter, receiver, transceiver, or communication unit. Furthermore, at least one of the baseband processor 5-20 and the RF processor 5-10 may include multiple communication modules to support multiple different RATs. In addition, at least one of the baseband processor 5-20 and the RF processor 5-10 may include different communication modules to process signals in different frequency bands. For example, the different RATs may include a wireless local area network (WLAN) technology (e.g., Institute of Electrical and Electronics Engineers (IEEE) 802.11), a cellular network technology (e.g., LTE), etc. Furthermore, the different frequency bands may include super-high frequency (SHF) bands (e.g., 2.5 GHz and 5 GHz) and millimeter (mm)-wave bands (e.g., 60 GHz).

The storage 5-30 stores basic programs, application programs, and data such as configuration information for operations of the UE. In particular, the storage 5-30 may store information related to a second access node that performs wireless communication using a second RAT. The storage 5-30 also provides stored data according to a request from the controller 5-40.

The controller 5-40 controls all operations of the UE. For example, the controller 5-40 transmits and receives signals via the baseband processor 5-20 and the RF processor 5-10. The controller 5-40 also writes and reads data to and from the storage 5-30. To achieve this, the controller 5-40 may include at least one processor. For example, the controller 5-40 may include a communication processor (CP) for performing control for communication and an application processor (AP) for controlling upper layers such as application programs. Also, the controller 5-40 may control operations of the UE or an entity corresponding thereto, according to various embodiments of the present disclosure.

Figure 6:
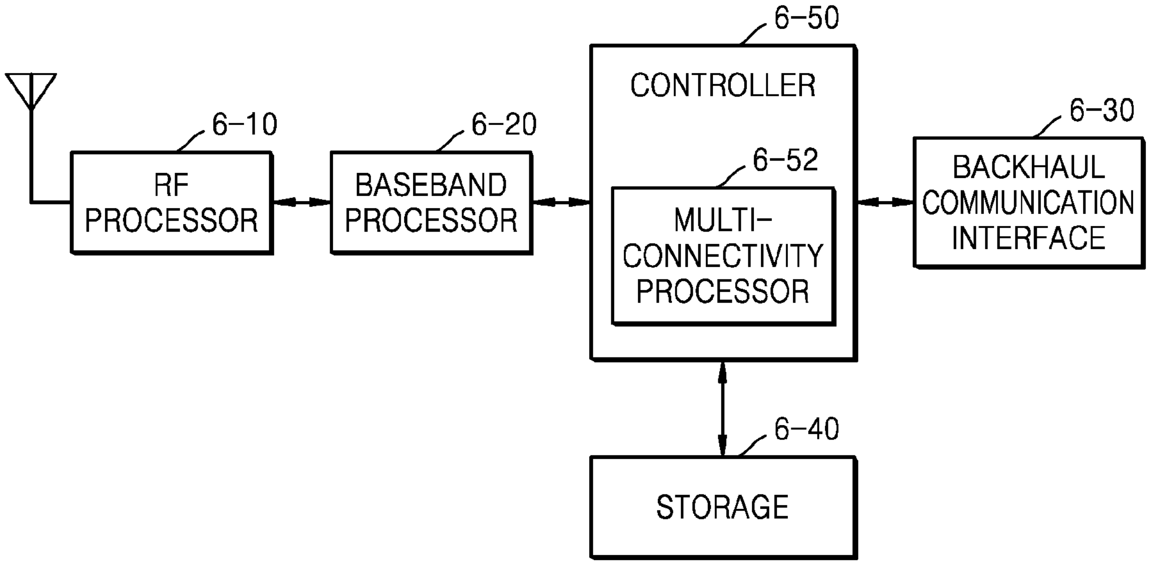
FIG. 6 is a block diagram of a configuration of a base station according to an embodiment of the present disclosure.

FIG. 6 is a block diagram of a configuration of a base station according to an embodiment of the present disclosure.

As illustrated in FIG. 6, the base station may include an RF processor 6-10, a baseband processor 6-20, a backhaul communication interface 6-30, a storage 6-40, and a controller 6-50. The controller 6-50 may include a multi-connectivity processor 6-52 that performs processing for operating in a multi-connectivity mode.

The RF processor 6-10 performs a function for transmitting and receiving a signal via a radio channel, such as signal conversion between bands and amplification. In detail, the RF processor 6-10 up-converts a baseband signal from the baseband processor 6-20 into an RF signal and transmits the RF signal via an antenna, and down-converts an RF signal received via the antenna into a baseband signal. For example, the RF processor 6-10 may include a transmit filter, a receive filter, an amplifier, a mixer, an oscillator, a DAC, an ADC, etc. Although only one antenna is shown in FIG. 6, the first access node may include multiple antennas. Also, the RF processor 6-10 may include multiple RF chains. Furthermore, the RF processor 6-10 may perform beamforming. For beamforming, the RF processor 6-10 may adjust a phase and magnitude of each of the signals transmitted and received through multiple antennas or antenna elements. The RF processor 6-10 may perform an MIMO DL operation by transmitting one or more layers.

The baseband processor 6-20 performs a function for conversion between a baseband signal and a bit string according to a physical layer standard of a first RAT. For example, when transmitting data, the baseband processor 6-20 generates complex symbols by encoding and modulating a transmission bit string. Furthermore, when receiving data, the baseband processor 6-20 reconstructs a reception bit string by demodulating and decoding a baseband signal from the RF processor 6-10. For example, according to an OFDM scheme, when transmitting data, the baseband processor 6-20 generates complex symbols by encoding and modulating a transmission bit string, maps the complex symbols to subcarriers, and then produces OFDM symbols through IFFT operations and CP insertion. Furthermore, when receiving data, the baseband processor 6-20 divides the baseband signal from the RF processor 6-10 into OFDM symbols, recovers signals mapped to subcarriers through FFT operations, and then reconstructs a reception bit string through demodulation and decoding. The baseband processor 6-20 and the RF processor 6-10 transmit and receive signals as described above. Thus, the baseband processor 6-20 and the RF processor 6-10 may be referred to as a transmitter, receiver, transceiver, communication unit, or wireless communication unit.

The backhaul communication interface 6-30 provides an interface to communicate with other nodes in a network. That is, the backhaul communication interface 6-30 converts a bit string to be transmitted from the base station to another node, such as an auxiliary base station, a CN, or the like, into a physical signal, and converts a physical signal received from the other node into a bit string.

The storage 6-40 stores basic programs, application programs, and data such as configuration information for operations of the base station. In particular, the storage 6-40 may store information about bearers allocated to a connected UE, measurement results reported by the connected UE, etc. Furthermore, the storage 6-40 may store information that is a criterion for determining whether to provide or terminate multiple connectivity to or from the UE. The storage 6-40 also provides stored data according to a request from the controller 6-50.

The controller 6-50 controls all operations of the base station. For example, the controller 6-50 transmits and receives signals through the baseband processor 6-20 and the RF processor 6-10 or through the backhaul communication interface 6-30. Furthermore, the controller 6-50 writes and reads data to and from the storage 6-40. To do so, the controller 6-50 may include at least one processor. Also, the controller 6-50 may control operations of the base station or an entity corresponding thereto, according to various embodiments of the present disclosure.

In various embodiments of the present disclosure, dual connection or dual connectivity (hereinafter referred to as "DC") may include both LTE-NR DC (ENDC) where a core network is an evolved packet core (EPC) and multi-RAT DC (MRDC) where the core network is a 5G core network (5GC). Furthermore, various embodiments of the present disclosure may include operations of a network and a UE according to RATs used by an MN and an SN.

Conventionally, the UE could be configured with only one of CHO or CPC configurations. Accordingly, the UE could perform a procedure associated with the only one of the CHO or CPC configurations. For example, if a CHO is configured for the UE, the UE may perform the CHO to which RRC configuration is applied as a corresponding condition is satisfied. In another example, if the network provides a HO command message to the UE and the UE performs a PCell handover, the UE may stop evaluating a CHO condition.

In another example, when CPC is configured for the UE, the UE may perform the CPC to which RRC configuration is applied as a corresponding condition is satisfied. When the network commands the UE to execute PSCell change and the UE executes the PSCell change, the UE may stop evaluating a CPC condition.

According to an embodiment of the present disclosure, a CHO and CPAC may be simultaneously configured for the UE. The UE may execute the CHO (or CPAC) that is initiated first and then execute CPAC (or CHO). Specifically, the following two embodiments are described.

Embodiment 1

When executing a CHO (or CPAC), the UE may stop evaluating CPAC (or CHO) execution conditions. In an embodiment of the present disclosure, the UE may prioritize executing a CHO. The UE may perform at least one of the following operations.

1) When executing a CHO, the UE may stop evaluation of CHO and CPAC execution conditions.

2) When executing CPAC, the UE may stop evaluation of CPAC execution conditions.

3) When CPAC is being executed and the CHO execution condition is satisfied and the corresponding CHO is triggered, the UE may fall back to a configuration applied before applying the corresponding RRCReconfiguration according to CPAC execution CPAC and execute the triggered CHO.

The same conditions/operations may be required for non-conditional mobility. In this case, the non-conditional mobility may include an immediate handover or PSCell change commanded by the network.

4) When receiving a HO command from the network and performing a HO, the UE may stop evaluation of CHO and CPAC execution conditions.

5) When receiving a PSCell change command from the network and performing a PSCell change, the UE may stop evaluation of CPAC execution conditions.

6) If a CHO is triggered while a PSCell change is being performed, the UE may fall back to a configuration applied before CPAC application and execute the triggered CHO.

Embodiment 2

The UE may not prioritize execution of conditional mobility and allow a new trigger therefor. The UE may perform at least one of the following operations.

1) When executing a CHO, the UE may stop evaluation of CHO and CPAC execution conditions.

2) When executing CPAC, the UE may stop evaluation of CHO and CPAC execution conditions.

As in the Embodiment 1, the same conditions/operations may be required for non-conditional mobility.

3) When receiving a HO command from the network and performing a HO, the UE may stop evaluation of CHO and CPAC execution conditions.

4) When receiving a PSCell change command from the network and performing a PSCell change, the UE may stop evaluation of CPAC execution conditions.

If both CHO and CPAC are configured for the UE and one conditional mobility among the CHO and CPAC is successfully executed, the UE may autonomously release configuration information for specific conditional mobility. The configuration information for the specific conditional mobility, which is released by the UE, may include at least one of a measurement ID related to the specific conditional mobility configuration information, a measurement object related to the measurement ID, and report configuration.

Autonomous release by the UE may occur in the following cases.

1) If a CHO is executed, the UE may release configuration information of CPAC and CHO candidates (i.e., if CHO happens, CPAC & CHO candidates will be cleared).

Specifically, if random access (RA) is successfully completed and reconfigurationWithSync was included in spCellConfig of an MCG in executed CondRRCReconig, then the UE may release all the entries stored in a variable VarConditionalReconfig, i.e., flush all the condReconfigs.

If VarConditionalReconfig of an MCG/SCG is maintained separately, the UE may perform release operation for all entries in VarConditionalReconfig of each MCG/SCG.

2) If the UE switches to an idle/inactive state or after cell selection in case of radio link failure (RLF), the UE may perform the same release as in 1).

3) If CPAC is executed, the UE may release CPAC candidates (i.e., if CPAC happens, only CPAC candidates will be cleared).

Specifically, if RA is successfully completed and reconfigurationWithSync was included in spCellConfig of an SCG in executed CondRRCReconfig and/or CPAC was configured, then the UE may release only the entries associated with CPAC within the variable VarConditionalReconfig; or the UE may release only the entries which have reconfigurationWithSync in spCellConfig of the SCG in condRRCReconfig in VarConditionalReconfig.

If VarConditionalReconfig of an MCG/SCG is maintained separately, then the UE may release the entries associated with CPAC within VarConditionalReconfig of the MCG. Also, the UE may release all the entries within VarConditionalReconfig of the SCG.

Figure 7:
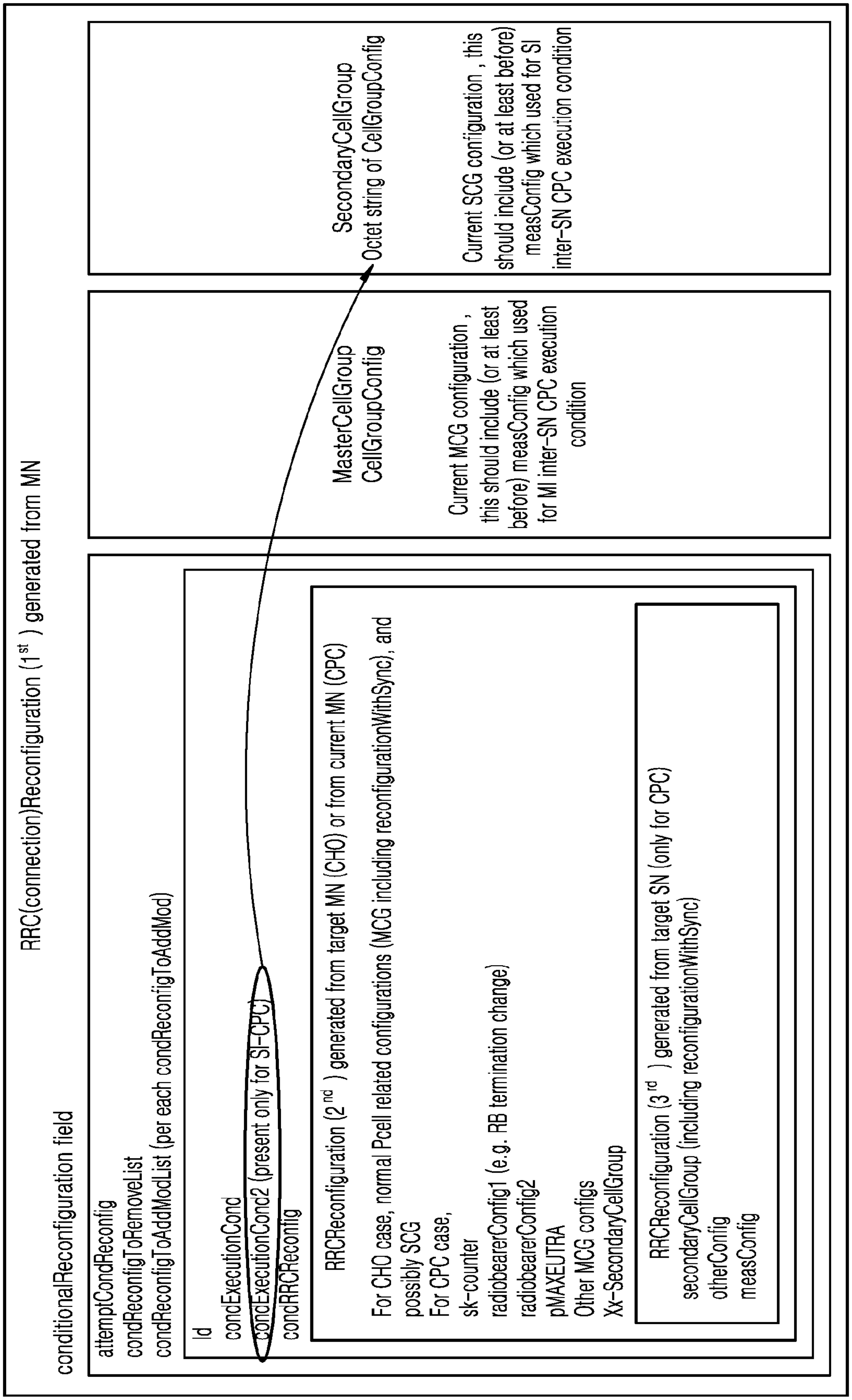
FIG. 7 is a diagram for describing a conditional handover (CHO) and conditional primary secondary cell (PSCell) addition/change (CPAC) according to an embodiment of the present disclosure.

FIG. 7 is a diagram for describing a CHO and CPAC according to an embodiment of the present disclosure.

Specifically, FIG. 7 is a diagram for describing information regarding a CHO and CPAC included in ConditionalReconfiguration. FIG. 7 illustrates a location of a reconfigurationWithSync field that distinguishes condRRCReconfig for the CHO from condRRCReconfig for the CPAC.

Figure 8:
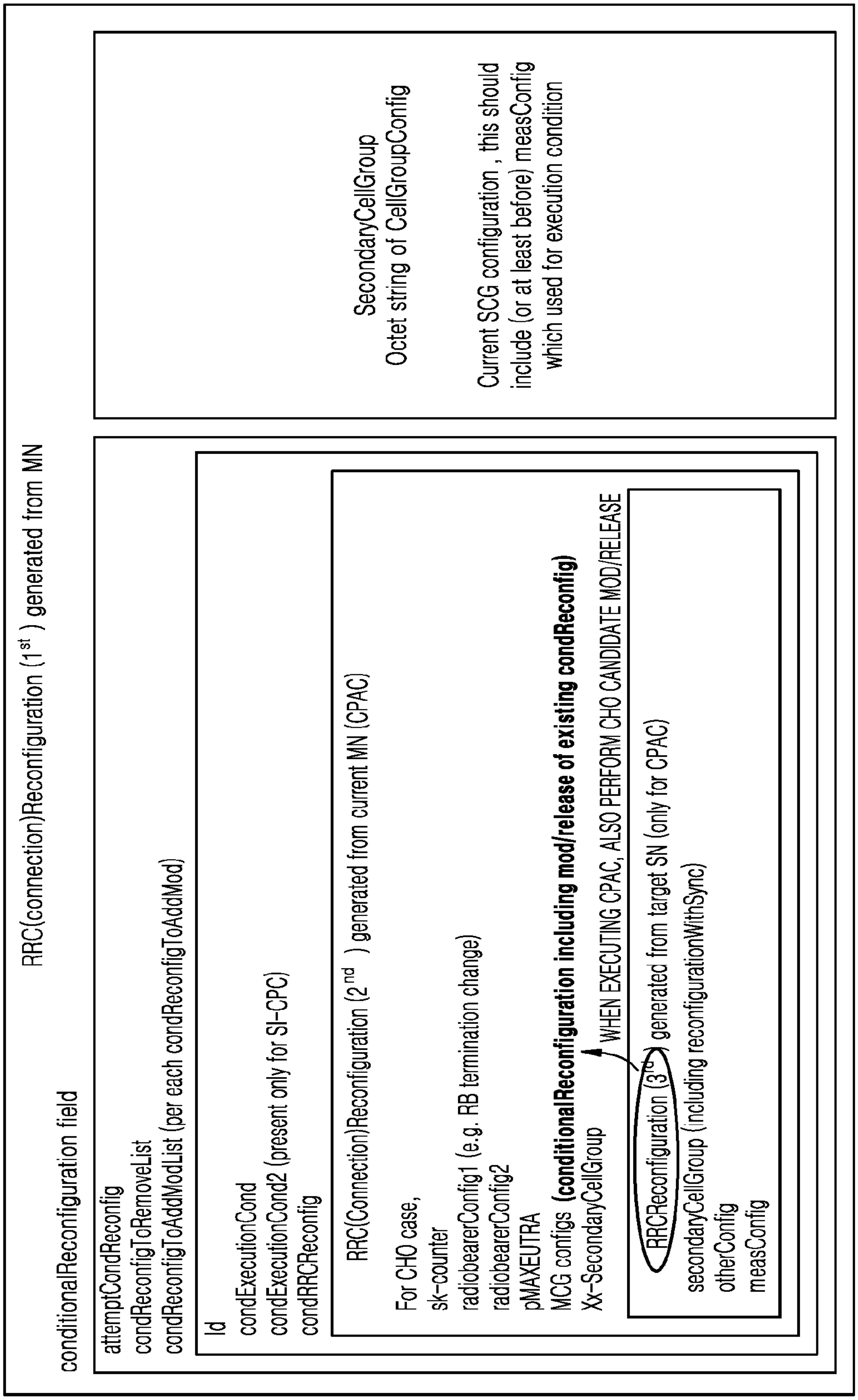
FIG. 8 is a diagram for describing a location of a conditionalReconfiguration field for changing a CHO configuration.

FIG. 8 is a diagram for describing a location of a conditionalReconfiguration field for changing a CHO configuration.

Hereinafter, an embodiment in which the network transmits a command to release condReconfig is described.

If necessary, the network may transmit a command to release the condReconfig to the UE by including the command in the conditionalReconfiguration field inside an RRCReconfiguration message. Furthermore, when CPAC is executed, the UE may release CPAC candidates and maintain CHO candidates according to a UE autonomous release operation. (i.e., only the CPAC candidates will be cleared, And the CHO candidates (or entries in VarConditionalReconfig) may be kept, but they could be released or modified by network release configuration).

That is, the network may change a condition/condRRCReconfig configuration for a specific CHO by including a condReconfigToAddMod or condReconfigToRelease field in a conditionalReconfiguration field for CPAC inside the RRCReconfiguration message.

Conventionally, in the case of non-conditional PSCell change, an applied RRCReconfiguration message does not contain a conditionalReconfiguration field for a CHO. In an embodiment of the present disclosure, even if the SecondaryCellGroup in the RRCReconfiguration message includes reconfigurationWithSync, the RRCReconfiguration message may include a conditionalReconfiguration field, and condReconfig add/mod/release operations for a CHO candidate may be performed.

For this purpose, the conditionalReconfiguration field may include the following description.

conditionalReconfiguration

Configuration of candidate target SpCell(s) and execution condition(s) for conditional handover or conditional PSCell change. The field is absent if any DAPS bearer is configured or if the masterCellGroup includes ReconfigurationWithSync. For conditional PSCell change, the field is absent if the secondaryCellGroup includes ReconfigurationWithSync. When RRC(connection)Reconfiguration message including this field generated by master node is used for condRRCReconfig for conditional PSCell change, even if secondaryCellGroup includes ReconfigurationWithSync, this field can be present. The RRCReconfiguration message contained in DLInformationTransferMRDC cannot contain the field conditionalReconfiguration for conditional PSCell change.

Figure 9:
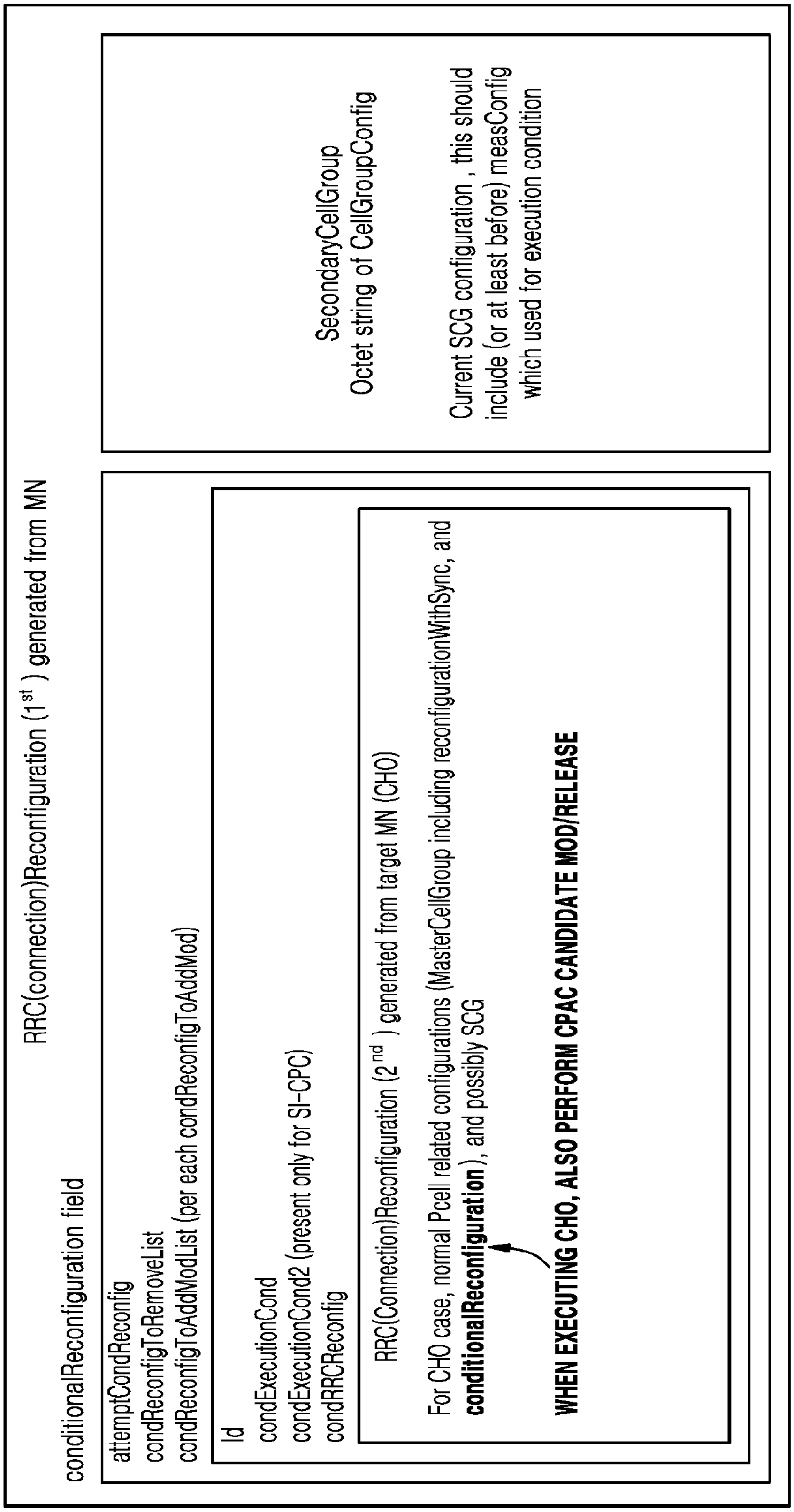
FIG. 9 is a diagram for describing a location of a conditionalReconfiguration field for changing a CPAC configuration.

FIG. 9 is a diagram for describing a location of a conditionalReconfiguration field for changing a CPAC configuration.

In an embodiment of the present disclosure, if a CHO is executed and CPAC configurations are not released by UE autonomous release, an RRCReconfiguration message applied for the CHO may include, in the conditionalReconfiguration field, a condReconfigToAdd/mod/release indicator that can modify the condReconfig of CPAC candidates currently stored in the UE.

For this purpose, the conditionalReconfiguration field may contain the following description.

conditionalReconfiguration

Configuration of candidate target SpCell(s) and execution condition(s) for conditional handover or conditional PSCell change. The field is absent if any DAPS bearer is configured. For conditional PSCell change, the field is absent if the secondaryCellGroup includes ReconfigurationWithSync. When RRC(connection)Reconfiguration message including this field generated by target master node is used for condRRCReconfig for CHO, even if masterCellGroup includes ReconfigurationWithSync, this field can be present. The RRCReconfiguration message contained in DLInformation TransferMRDC cannot contain the field conditionalReconfiguration for conditional PSCell change.

Figure 10:
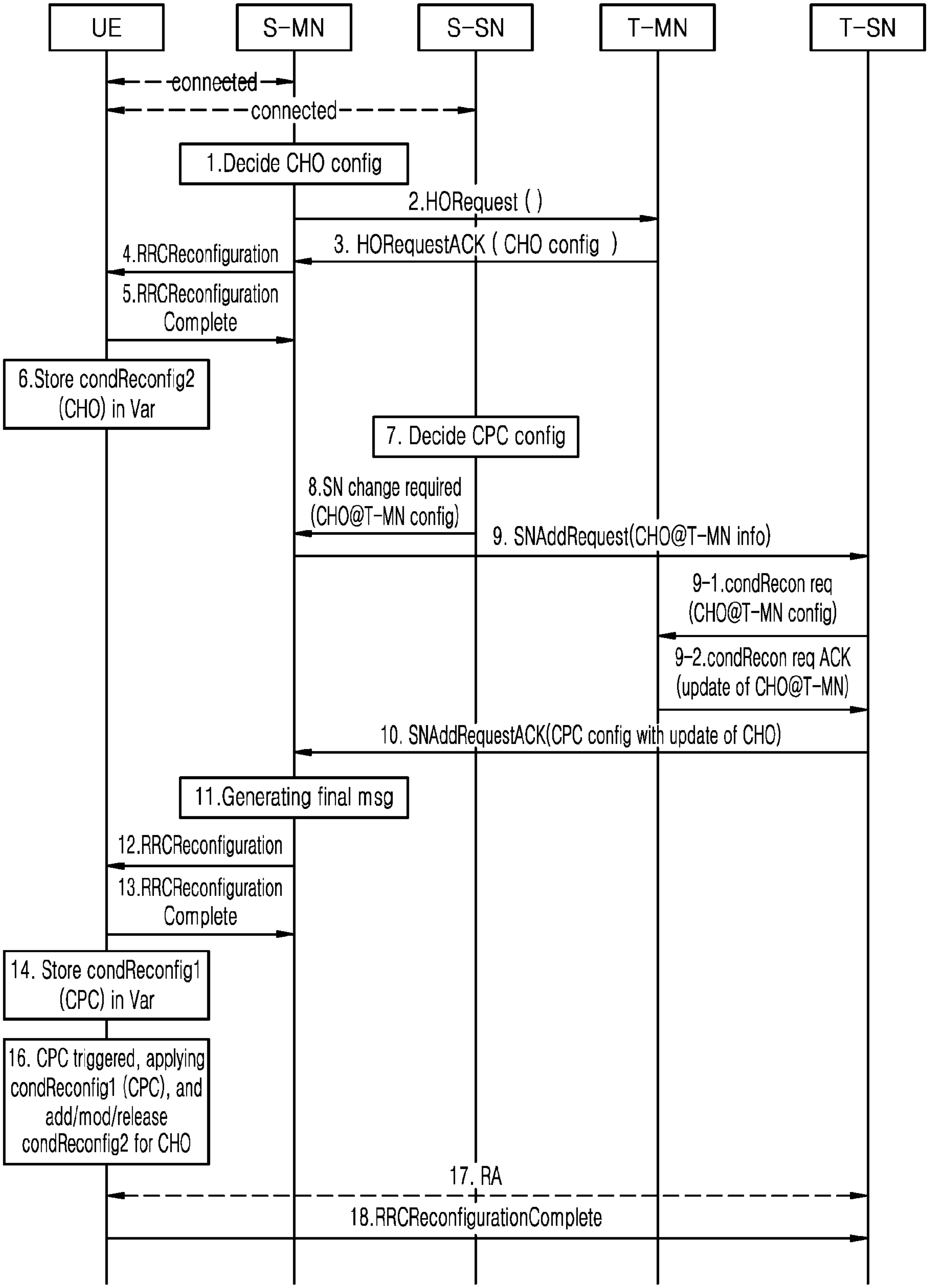
FIG. 10 is a diagram for describing an operation of changing a configuration of a CHO candidate, according to an embodiment of the present disclosure.

FIG. 10 is a diagram for describing an operation of changing a configuration of a CHO candidate, according to an embodiment of the present disclosure.

Specifically, FIG. 10 illustrates a process of transmitting, to a UE, an RRCReconfiguration message including conditionalReconfiguration for changing configuration of a CHO candidate when CPAC is executed (in FIG. 10, the procedure executed is marked as CPC, but CPAC may also be applied equally).

A source master node (hereinafter referred to as "S-MN") may decide to configure a CHO first, and receive configuration information of a CHO candidate from a target master node (hereinafter referred to as "T-MN").

The S-MN may bundle a condReconfig id, a condition, and a condRRCReconfig field in a conditionalReconfiguration field inside an RRCReconfiguration message and transmit it to the UE. After receiving a condReconfig list, the UE may store the condReconfig list.

Then, a source secondary node (hereinafter referred to as "S-SN") may decide to configure CPAC, determine a target secondary node (hereinafter referred to as "T-SN"), and then transmit SNchangeRequired message including CPAC preparation information to the S-MN. The SNchangeRequired message may include CHO configuration information generated by the T-MN and transmitted to the UE.

The S-MN may transmit, to the T-SN, the SNAddReq message including a request for the CHO configuration information generated by the T-MN and the CPAC preparation information.

Upon receiving the SNAddReq message, the T-SN may transmit node information of the T-SN, i.e., a node id, to the T-MN. Also, when CPAC is executed, the T-SN may request changed CHO configuration information from the T-MN by considering that the T-SN becomes an SCG, and the T-MN may transmit the changed CHO configuration information to the T-SN.

Upon receiving the changed CHO configuration information, the T-SN may transmit the CHO configuration information to the S-SN, and the S-SN may transmit, to the S-MN, an SNAddReqACK message including the updated CHO configuration information and CPAC configuration information from the T-SN.

The S-MN may transmit, to the UE, an RRC reconfiguration message that includes the updated CHO configuration information in the conditionalReconfiguration field of an MN part and the received CPAC configuration information in an SN part. In this case, the RRC reconfiguration message may include condRRCReconfig for CPAC and may be a final RRCReconfiguration message.

When CPAC is executed while evaluating CPAC and CHO conditions, the UE receiving the RRC reconfiguration message may update the CHO configuration while applying the given CPAC configuration.

Figure 11:
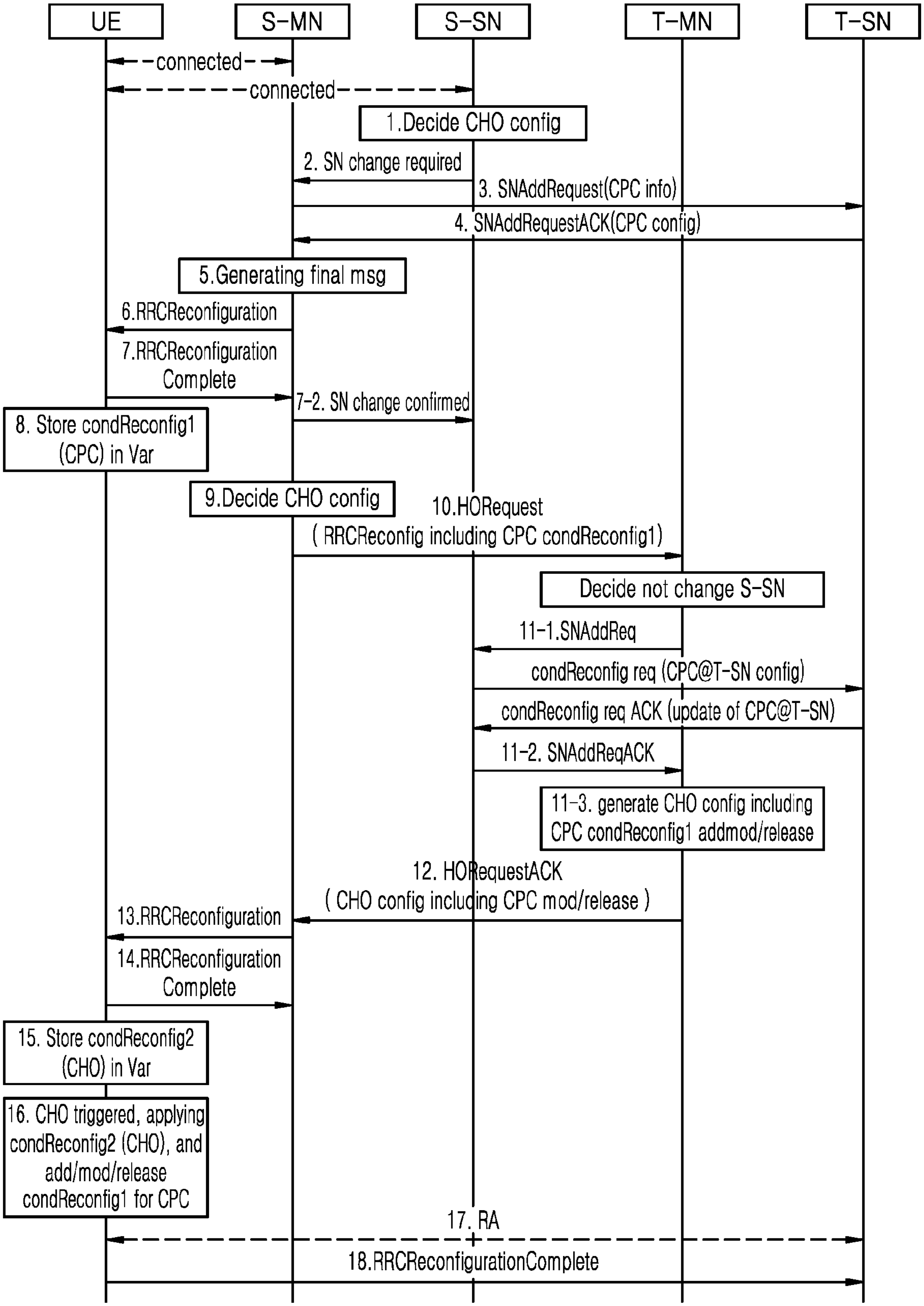
FIG. 11 is a diagram for describing an operation of updating a CPAC configuration, according to an embodiment of the present disclosure.

FIG. 11 is a diagram for describing an operation of updating a CPAC configuration, according to an embodiment of the present disclosure.

In detail, FIG. 11 is a diagram illustrating an operation of updating a CPAC configuration (in FIG. 11, the configuration is marked as CPC, but CPAC may be equally applied) when CHO is executed.

The S-SN may decide to configure CPAC, determine T-SN, and then transmit SNchangeRequired message including CPAC preparation information to the S-MN.

Upon receiving the SNchangeRequired message, the S-MN may transmit, to the T-SN, an SNAddReq message including CPAC preparation information and CPAC configuration information.

After receiving the SNAddReq message, the T-SN may transmit, to the S-MN, an SNAddReqACK message including the CPAC configuration information from the T-SN.

The S-MN may transmit, to the UE, an RRC reconfiguration message (RRCReconfiguration (2nd) generated from target MN or from current MN in FIG. 7) including the received CPAC configuration information (RRCReconfiguration (3rd) generated from target SN in FIG. 7) in the SN part. In this case, the RRC reconfiguration message may include condRRCReconfig for CPAC and may be an RRCReconfiguration message generated by the S-MN (RC (connection)Reconfiguration (1st) generated from MN in FIG. 7). Upon receiving this message, the UE may store the corresponding CPAC configuration information and start measurement for an execution condition.

The S-MN may also decide to configure a CHO and request a CHO configuration from the T-MN via a HORequest message. At this time, the S-MN may transmit, to the T-MN, an RRCReconfiguration message including the CPAC configuration information (CPAC condReconfig) previously received from the T-SN.

Upon receiving the message, the T-MN may decide not to change the S-SN and transmit an SNAddReq message to the S-SN. At this time, the T-SN-based CPAC configuration information received from the S-MN may also be transmitted.

Upon receiving the SNAddReq message, the S-SN may request the T-SN to update the existing T-SN-based CPAC configuration information when the CHO is executed. The message may be a new or existing Xn application protocol (AP) message.

Thereafter, the T-SN may transmit node information of the T-SN, i.e., a node id, to the S-SN. Also, when the CHO is executed, the T-SN may transmit the changed CHO configuration information to the S-SN by considering that the T-SN becomes an SCG. The message may be a new or the existing Xn application protocol (AP) message.

Upon receiving the changed CPAC configuration information, the S-SN may transmit an SNAddReqACK message to the T-MN.

The T-MN may generate CHO configuration information including CPAC configuration information and the updated CPAC configuration information and transmit the CHO configuration information to the S-MN.

Upon receiving this, the S-MN may transmit, to the UE, an RRC reconfiguration message that includes the CHO configuration information in the conditionalReconfiguration field of the MN part and the received CPAC configuration information in the SN part.

When the CHO is executed while evaluating CPAC and CHO conditions, the UE receiving the message may update the CPAC configuration while applying the given CHO configuration.

Figure 12:
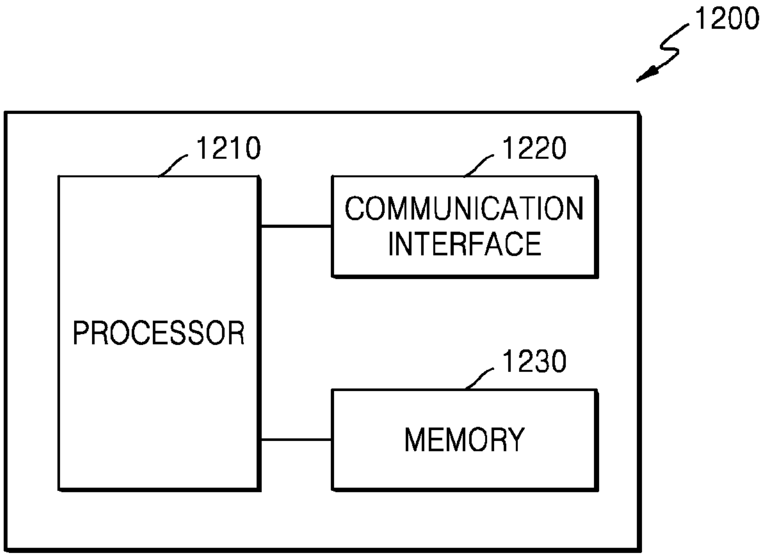
FIG. 12 is a diagram for describing a UE according to an example embodiment of the present disclosure.

FIG. 12 is a diagram for describing a UE according to an example embodiment of the present disclosure.

A UE 1200 may include a processor 1210, a communication interface 1220, and a memory 1230. However, because all of the components illustrated in FIG. 12 are not essential, the UE 1200 may be implemented with more or fewer components than illustrated. Furthermore, the processor 1210, the communication interface 1220, and the memory 1230 may be implemented as a single chip in some cases. The UE 1200 may correspond to the UE 400 illustrated in FIG. 4.

The processor 1210 may include one or more processors or other processing devices that control the disclosed functions, processes and/or methods. Operations of the UE 1200 may be implemented by the processor 1210.

The communication interface 1220 may include an RF transmitter for up-converting and amplifying a frequency of a signal to be transmitted and an RF receiver for down-converting a frequency of a received signal. However, according to another embodiment, the communication interface 1220 may be implemented with more or fewer components than described above.

The communication interface 1220 may be coupled to the processor 1210 to transmit and/or receive signals. The signals may include control information and data. Also, the communication interface 1220 may receive a signal via a radio channel and output the received signal to the processor 1210. The communication interface 1220 may transmit a signal output from the processor 1210 via a radio channel.

The memory 1230 may store control information or data included in a signal obtained by the UE 1200. The memory 1230 may be coupled to processor 1210 and store at least one instruction or protocol or parameter for the disclosed functions, processes and/or methods. The memory 1230 may include read-only memory (ROM) and/or random access memory (RAM) and/or hard disk and/or CD-ROM and/or digital video discs (DVDs) and/or other storage devices.

Figure 13:
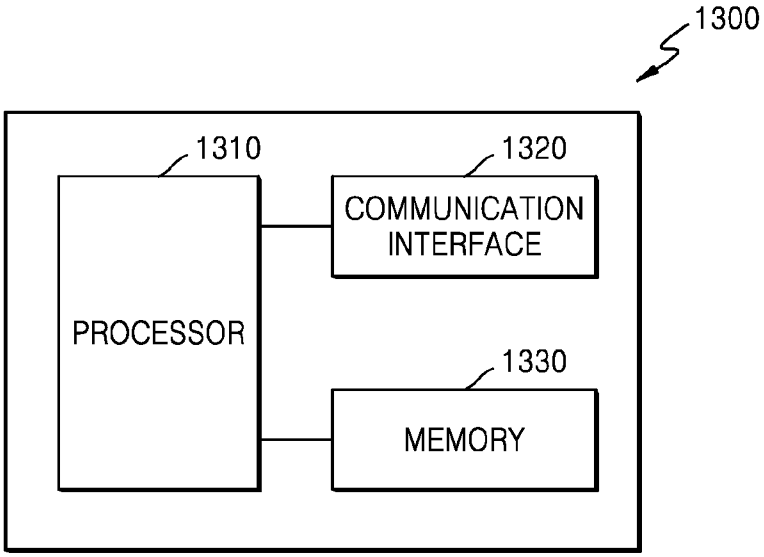
FIG. 13 is a diagram for describing a network equipment according to an example embodiment of the present disclosure.

FIG. 13 is a diagram for describing a network equipment according to an example embodiment of the present disclosure.

A network equipment 1300 may include a processor 1310, a communication interface 1320, and a memory 1330. However, because all of the components illustrated in FIG. 13 are not essential, the network equipment 1300 may be implemented with more or fewer components than illustrated. Furthermore, the processor 1310, the communication interface 1320, and the memory 1330 may be implemented as a single chip in some cases.

The processor 1310 may include one or more processors or other processing devices that control the disclosed functions, processes and/or methods. Operations of the network equipment 1300 may be implemented by the processor 1310.

The communication interface 1320 may include an RF transmitter for up-converting and amplifying a frequency of a signal to be transmitted and an RF receiver for down-converting a frequency of a received signal. However, according to another embodiment, the communication interface 1320 may be implemented with more or fewer components than described above.

The communication interface 1320 may be coupled to the processor 1310 to transmit and/or receive signals. The signals may include control information and data. Also, the communication interface 1320 may receive a signal via a radio channel and output the received signal to the processor 1310. The communication interface 1320 may transmit a signal output from the processor 1310 via a radio channel.

The memory 1330 may store control information or data included in a signal obtained by the network equipment 1300. The memory 1330 may be coupled to processor 1310 and store at least one instruction or protocol or parameter for the disclosed functions, processes and/or methods. The memory 1330 may include ROM and/or RAM and/or hard disk and/or CD-ROM and/or DVDs and/or other storage devices.

According to an embodiment of the present disclosure, a method performed by a UE in a wireless communication system is provided. The method according to the embodiment includes: receiving a plurality of conditional mobility configuration information from a network; storing the plurality of conditional mobility configuration information; evaluating a mobility execution condition based on first conditional mobility configuration information among the plurality of conditional mobility configuration information; executing conditional mobility based on the first conditional mobility configuration information when the mobility execution condition based on the first conditional mobility configuration information is satisfied; and releasing second conditional mobility configuration information different from the first conditional mobility configuration information from among the stored plurality of conditional mobility configuration information.

According to an embodiment, the plurality of conditional mobility configuration information include CHO configuration information for changing a PCell of an MCG and CPAC configuration information for adding or changing a PSCell of an SCG.

According to an embodiment, the first conditional mobility configuration information is the CHO configuration information, the second conditional mobility configuration information is the CPAC configuration information, an execution condition for a CHO is evaluated based on the CHO configuration information, and in the releasing, if the execution condition for the CHO is satisfied, the CHO is executed and the CPAC configuration information is released.

According to an embodiment, the plurality of conditional mobility configuration information are stored in a variable VarConditionalReconfig, and when the CHO is executed and random access is successfully completed, an entry related to the CPAC configuration information stored in the variable VarConditionalReconfig is released.

According to an embodiment, the first conditional mobility configuration information is the CPAC configuration information, the second conditional mobility configuration information is the CHO configuration information, an execution condition for CPAC is evaluated based on the CPAC configuration information, and in the releasing, if the execution condition for the CPAC is satisfied, the CPAC is executed and the CHO configuration information is released.

According to an embodiment, the plurality of conditional mobility configuration information are stored in the variable VarConditionalReconfig, and when the CPAC is executed and random access is successfully completed, an entry related to the CHO configuration information stored in the variable VarConditionalReconfig is released.

According to an embodiment, the plurality of conditional mobility configuration information are received from the network via an RRCReconfiguration message, and the released second conditional mobility configuration information includes at least one of a measurement ID related to the second conditional mobility configuration information, a measurement object related to the measurement ID, and report configuration.

According to an embodiment of the present disclosure, a UE in a wireless communication system is provided, which includes: a transceiver; and at least one processor coupled to the transceiver, wherein the at least one processor receives a plurality of conditional mobility configuration information from a network, stores the plurality of conditional mobility configuration information, evaluates a mobility execution condition based on first conditional mobility configuration information among the plurality of conditional mobility configuration information, executes conditional mobility based on the first conditional mobility configuration information when the mobility execution condition based on the first conditional mobility configuration information is satisfied, and releases second conditional mobility configuration information different from the first conditional mobility configuration information from among the stored plurality of conditional mobility configuration information.

According to an embodiment, the plurality of conditional mobility configuration information include CHO configuration information for changing a PCell of an MCG and CPAC configuration information for adding or changing a PSCell of an SCG.

According to an embodiment, the first conditional mobility configuration information is the CHO configuration information, and the second conditional mobility configuration information is the CPAC configuration information, and the at least one processor evaluates an execution condition for a CHO based on the CHO configuration information, and if the execution condition for the CHO is satisfied, executes the CHO and releases the CPAC configuration information.

According to an embodiment, the at least one processor stores the plurality of conditional mobility configuration information in a variable VarConditionalReconfig, and when the CHO is executed and random access is successfully completed, release an entry related to the CPAC configuration information stored in the variable VarConditionalReconfig.

According to an embodiment, the first conditional mobility configuration information is the CPAC configuration information, and the second conditional mobility configuration information is the CHO configuration information, and the at least one processor evaluates an execution condition for CPAC based on the CPAC configuration information, and if the execution condition for the CPAC is satisfied, executes the CPAC and releases the CHO configuration information.

According to an embodiment, the at least one processor stores the plurality of conditional mobility configuration information in the variable VarConditionalReconfig, and when the CPAC is executed and random access is successfully completed, releases an entry related to the CHO configuration information stored in the variable VarConditionalReconfig.

According to an embodiment, the plurality of conditional mobility configuration information are received from the network via an RRCReconfiguration message, and the released second conditional mobility configuration information includes at least one of a measurement ID related to the second conditional mobility configuration information, a measurement object related to the measurement ID, and report configuration.

According to an embodiment of the present disclosure, a method performed by a base station in a wireless communication system is provided. According to an embodiment, the method includes: generating CHO configuration information for changing a PCell of an MCG; generating CPAC configuration information for adding or changing a PSCell of an SCG; and transmitting the CHO configuration information and the CPAC configuration information to a UE, and when executing conditional mobility based on one conditional mobility configuration information among the CHO configuration information and the CPAC configuration information, the UE releases the other conditional mobility configuration information.

The embodiments of the present disclosure disclosed in the present specification and the accompanying drawings have been provided only as specific examples in order to easily describe technical features in the present disclosure and assist in understanding the present disclosure and are not intended to limit the scope of the present disclosure. It is obvious to one of ordinary skill in the art that other modifications based on the technical spirit of the present disclosure are implementable in addition to the embodiments disclosed herein.

Also, the embodiments disclosed in the present specification and the drawings have been provided only as specific examples in order to easily describe technical features in the present disclosure and assist in understanding thereof and are not intended to limit the scope of the present disclosure. Therefore, the scope of the present disclosure is should be construed to include all modifications or variations derived from the technical features of the present disclosure, in addition to the embodiments disclosed herein.

The invention claimed is:

1. A method performed by a user equipment (UE) in a wireless communication system, the method comprising:

receiving, from a base station, a Radio Resource Control (RRC) reconfiguration message comprising first conditional mobility configuration information for conditional primary secondary cell (PSCell) addition and change (CPAC);

receiving, from the base station, a RRC reconfiguration message comprising second conditional mobility configuration information for conditional handover (CHO);

evaluating an execution condition of the CPAC and an execution condition of the CHO based on the first conditional mobility configuration information and the second conditional mobility configuration information;

executing the CPAC based on the first conditional mobility configuration information in case that the execution condition of the CPAC is satisfied;

stopping evaluation of the execution condition of the CHO based on the execution of the CPAC; and releasing all entries stored in a first variable VarConditionalReconfig for a master cell group (MCG) and a second variable VarConditionalReconfig for a secondary cell group (SCG) based on the execution of the CPAC.

2. The method of claim 1, further comprising:

releasing all the entries stored in the first variable VarConditionalReconfig and the second variable VarConditionalReconfig in case that random access is successfully completed and reconfiguration With Sync is included in spcellConfig of the MCG.

3. The method of claim 1, wherein the releasing comprises releasing all the entries stored in the first variable VarConditionalReconfig and the second variable VarConditionalReconfig in case that cell selection is performed.

4. The method of claim 1, further comprising:

releasing all the entries stored in the first variable VarConditionalReconfig and the second variable VarConditionalReconfig in case that a status of the UE becomes RRC_IDLE.

5. The method of claim 1, further comprises:

stopping evaluation of the execution condition of the CPAC based on the execution of the CPAC.

6. A user equipment (UE) in a wireless communication system, the UE comprising:

a transceiver; and at least one processor coupled to the transceiver and configured to:

receive, from a base station, a Radio Resource Control (RRC) reconfiguration message comprising first conditional mobility configuration information for conditional primary secondary cell (PSCell) addition and change (CPAC), receive, from the base station, a RRC reconfiguration message comprising second conditional mobility configuration information for conditional handover (CHO), evaluate an execution condition of the CPAC and an execution condition of the CHO based on the first conditional mobility configuration information and the second conditional mobility configuration information, execute the CPAC based on the first conditional mobility configuration information in case that the execution condition of the CPAC is satisfied, stop evaluation of the execution condition of the CHO based on the execution of the CPAC, and release all entries stored in a first variable VarConditionalReconfig for a master cell group (MCG) and a second variable VarConditionalReconfig for a secondary cell group (SCG) based on the execution of the CPAC.

7. The UE of claim 6, wherein the at least one processor is further configured to release all the entries stored in the first variable VarConditionalReconfig and the second variable VarConditionalReconfig in case that random access is successfully completed and reconfigurationWithSync is included in spcellConfig of the MCG.

8. The UE of claim 6, wherein the at least one processor is further configured to release all the entries stored in the first variable VarConditionalReconfig and the second variable VarConditionalReconfig in case that cell selection is performed.

9. The UE of claim 6, wherein the at least one processor is further configured to release all the entries stored in the first variable VarConditionalReconfig and the second variable VarConditionalReconfig in case that a status of the UE becomes RRC_IDLE.

10. The UE of claim 6, wherein the at least one processor is further configured to stop evaluation of the execution condition of the CPAC based on the execution of the CPAC.

11. A method performed by a base station in a wireless communication system, the method comprising:

transmitting a Radio Resource Control (RRC) reconfiguration message comprising first conditional mobility configuration information for conditional primary secondary cell (PSCell) addition and change (CPAC) to a user equipment (UE); and transmitting a RRC reconfiguration message comprising second conditional mobility configuration information for conditional handover (CHO) to the UE, wherein, based on execution of the CPAC, the UE stops evaluation of an execution condition of the CHO and releases all entries stored in a first variable VarConditionalReconfig for a master cell group (MCG) and a second variable VarConditionalReconfig for a secondary cell group (SCG).

12. The method of claim 11, wherein the UE releases all the entries stored in the first variable VarConditionalReconfig and the second variable VarConditionalReconfig in case that random access is successfully completed and reconfigurationWithSync is included in spcellConfig of the MCG.

13. The method of claim 11, wherein the UE releases all the entries stored in the first variable VarConditionalReconfig and the second variable VarConditionalReconfig in case that cell selection is performed.

14. The method of claim 11, wherein the UE releases all the entries stored in the first variable VarConditionalReconfig and the second variable VarConditionalReconfig in case that a status of the UE becomes RRC_IDLE.

15. The method of claim 11, wherein, based on the execution of the CPAC, the UE stops evaluation of an execution condition of the CPAC.

* * * * *